(12) United States Patent
Singamsetty (10) Patent No.: US 11,402,640 B1
(45) Date of Patent: Aug. 2, 2022

(54) DISPLAY ADJUSTMENT FOR HEAD-MOUNTABLE DEVICE

(71) Applicant: Apple Inc., Cupertino, CA (US)

(72) Inventor: Divakar Singamsetty, San Jose, CA (US)

(73) Assignee: APPLE INC., Cupertino, CA (US)

( * ) Notice: Subject to any disclaimer, the term of this patent is extended or adjusted under 35 U.S.C. 154(b) by 251 days.

(21) Appl. No.: 16/892,129

(22) Filed: Jun. 3, 2020

Related U.S. Application Data (60) Provisional application No. 62/887,509, filed on Aug. 15, 2019.

(51) Int. Cl.
*G02B 27/01* (2006.01)

(52) U.S. Cl.
CPC ...... *G02B 27/0176* (2013.01); *G02B 27/0172* (2013.01); *G02B 2027/0154* (2013.01); *G02B 2027/0163* (2013.01); *G02B 2027/0178* (2013.01)

(58) Field of Classification Search
CPC ............ G02B 27/0176; G02B 27/0172; G02B 2027/0138; G02B 2027/0154; G02B 2027/0163; G02B 2027/0178
See application file for complete search history.

(56) References Cited

U.S. PATENT DOCUMENTS

| | | | | |
|---|---|---|---|---|
| 4,660,943 A * | 4/1987 | Ellis | ...................... | A42B 3/042 359/362 |
| 5,471,678 A * | 12/1995 | Dor | ........................ | A42B 3/042 2/6.7 |
| 9,513,479 B2 | 12/2016 | Komatsu et al. | | |
| 9,684,170 B2 | 6/2017 | Simmonds | | |
| 2002/0148032 A1 * | 10/2002 | Basson | ..................... | A42B 3/32 2/6.2 |
| 2004/0181858 A1 * | 9/2004 | Soto | .................... | G02B 27/0176 2/448 |
| 2006/0007562 A1 * | 1/2006 | Willey | ............... | G02B 27/0149 359/811 |
| 2006/0174401 A1 * | 8/2006 | Prendergast | ........... | G02B 7/002 2/422 |
| 2007/0114252 A1 * | 5/2007 | Gruebel | .................... | A42B 3/04 224/181 |
| 2008/0263752 A1 * | 10/2008 | Solinsky | ................. | A42B 3/042 2/422 |
| 2009/0135505 A1 * | 5/2009 | Willey | .................. | G02B 23/125 359/815 |
| 2010/0180364 A1 * | 7/2010 | Willey | ................... | A42B 3/042 2/422 |
| 2012/0002046 A1 * | 1/2012 | Rapoport | ........... | G02B 27/0176 348/E7.091 |

(Continued)

*Primary Examiner* — Bao-Luan Q Le
(74) *Attorney, Agent, or Firm* — BakerHostetler (57) ABSTRACT

A head-mountable device can include an optical module that provides a display element that is moveable based on pressure and/or temperature changes within an enclosed chamber. The control mechanisms can directly and/or indirectly alter one or more of the temperature, pressures, and/or volume of the enclosed chamber. As the conditions within the chamber are altered, an extendable member can expand and/or retract to move the display element towards and/or away from a user's eye. The mechanisms for controlling the position of the display element can be actively and/or passively controlled.

20 Claims, 5 Drawing Sheets

(56) References Cited

U.S. PATENT DOCUMENTS

| | | | |
|---|---|---|---|
| 2014/0327962 A1* | 11/2014 | Teetzel | F41G 11/003 359/409 |
| 2015/0002930 A1* | 1/2015 | Teetzel | G02B 23/18 359/409 |
| 2016/0085077 A1* | 3/2016 | Milea | G02B 27/0149 359/632 |
| 2017/0176756 A1* | 6/2017 | Takahashi | G02B 27/0176 |
| 2018/0180895 A1* | 6/2018 | Pombo | G02B 27/0176 |

* cited by examiner

DISPLAY ADJUSTMENT FOR HEAD-MOUNTABLE DEVICE

CROSS-REFERENCE TO RELATED APPLICATION

This application claims the benefit of U.S. Provisional Application No. 62/887,509, entitled "DISPLAY ADJUSTMENT FOR HEAD-MOUNTABLE DEVICE," filed Aug. 15, 2019, the entirety of which is incorporated herein by reference.

TECHNICAL FIELD

The present description relates generally to head-mountable devices, and, more particularly, to display adjustment for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. The head-mountable device can provide a user experience that is immersive or otherwise natural so the user can easily focus on enjoying the experience without being distracted by the mechanisms of the head-mountable device.

Components of a head-mountable device can include one or more optical modules that provide images and/or views (e.g., to an external environment). Such optical modules can include a display element and/or optical elements that enhance a user's view. The display element can be oriented in a direction that optimally provides a view along an optical pathway between the display element and the eye of the user. For example, the display element can emit and/or transmit light along the optical pathway to arrive at the user's eye.

To accommodate different users and provide various visual effects, it can be desirable to provide dynamic or adaptive focus by moving the display element towards and/or away from the user's eye. The effects of such movement include an alteration of where the user's eye focuses. It can be further desirable to provide such movement with simple actuation mechanisms that do not burden the system with significantly greater weight, space occupation, and/or power consumption.

Systems of the present disclosure can include a head-mountable device with an optical module that provides a display element that is moveable based on pressure and/or temperature changes within an enclosed chamber. The control mechanisms can directly and/or indirectly alter one or more of the temperature, pressures, and/or volume of the enclosed chamber. As the conditions within the chamber are altered, an extendable member can expand and/or retract to move the display element towards and/or away from a user's eye. The mechanisms for controlling the position of the display element can be actively and/or passively controlled.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
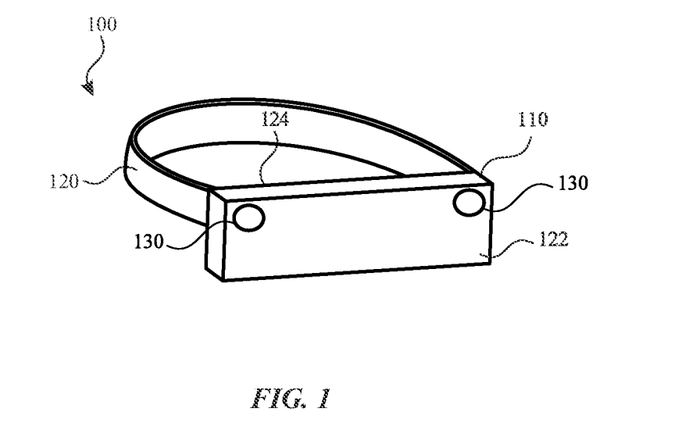
FIG. 1 illustrates a perspective view of a head-mountable device on a user, according to some embodiments of the present disclosure.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. Any number of components can be included within and/or on the frame 110 and/or the securement element 120.

The frame 110 can include and/or support one or more cameras 130. The cameras 130 can be positioned on or near an outer side 122 of the frame 110 to capture images of views external to the head-mountable device 100. As used herein, an outer side of a portion of a head-mountable device is a side that faces away from the user and/or towards an external environment. The captured images can be used for display to the user or stored for any other purpose.

Figure 2:
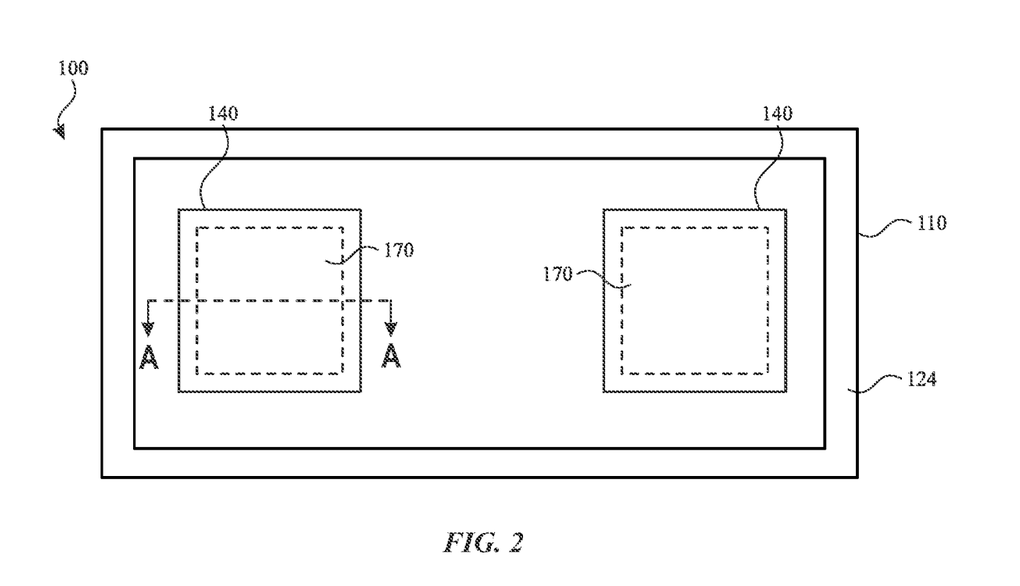
FIG. 2 illustrates a rear view of a head-mountable device, according to some embodiments of the present disclosure.

Referring now to FIG. 2, a head-mountable device can be provided with optical modules that provide visual output for viewing by a user wearing the head-mountable device. As shown in FIG. 2, one or more optical modules 140 can be positioned on an inner side 124 of the frame 110. As used herein, an inner side of a portion of a head-mountable device is a side that faces toward the user and/or away from the external environment. For example, a pair of optical modules 140 can be provided, where each optical module 140 is movably positioned to be within the field of view of each of a user's two eyes. Each optical module 140 can be adjusted to align with a corresponding eye of the user. For example, each optical module 140 can be moved along one or more axes until a center of each optical module 140 is aligned with a center of the corresponding eye. Accordingly, the distance between the optical modules 140 can be set based on an interpupillary distance of the user. For example, one or more module actuators can be provided to move the optical module 140 relative to the frame 110 of the head-mountable device 100.

Movement of each of the optical modules can match movement of a corresponding camera module. For example, each optical module 140 can be supported on the inner side 124 of the frame 110, and a camera 130 can be coupled to and movable with a corresponding one of the optical modules 140. The optical module 140 can be adjusted to align with the corresponding eye of the user, and the camera 130 can be correspondingly adjusted so that the field of view provided by the optical module 140 corresponds to a field of view captured by the camera 130. Accordingly, the optical module 140 is able to accurately reproduce, simulate, or augment a view based on a view captured by the camera 130 with an alignment that corresponds to the view that the user would have naturally without the head-mountable device 100.

An optical module 140 can transmit light from a physical environment (e.g., as captured by a camera module) for viewing by the user. Such an optical module 140 can include optical properties, such as lenses for vision correction based on incoming light from the physical environment. Additionally or alternatively, an optical module 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 3:
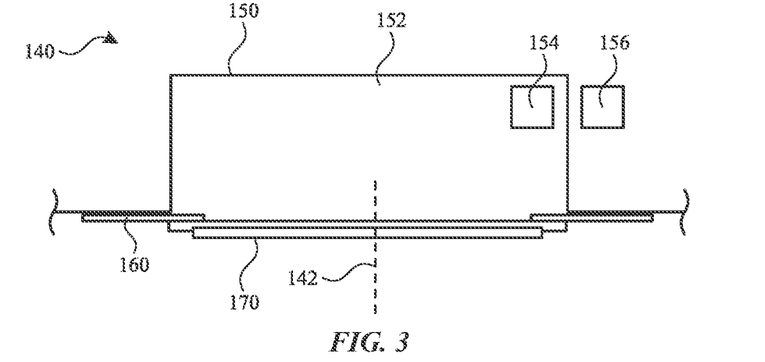
FIG. 3 illustrates a top schematic view of an optical module of the head-mountable device of FIG. 2 taken along line A-A and having an extendable member in a retracted configuration, according to some embodiments of the present disclosure.
Figure 4:
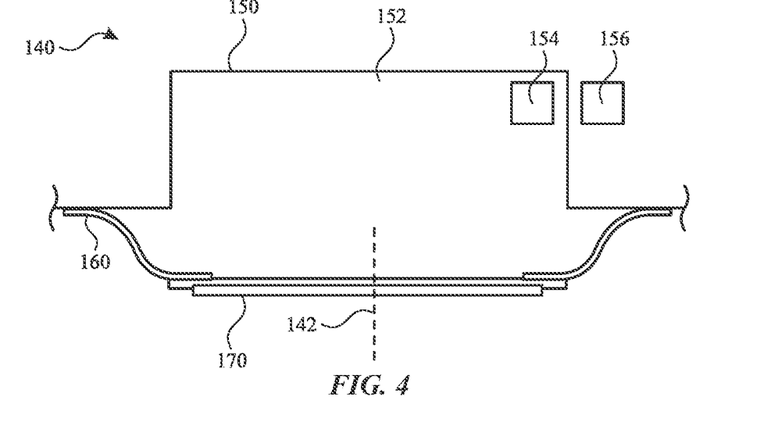
FIG. 4 illustrates another schematic view of the optical module of FIG. 3 with the extendable member in an expanded configuration, according to some embodiments of the present disclosure.

Referring now to FIGS. 3 and 4, an optical module can provide visual output for viewing by a user. While a single optical module 140 as shown in FIG. 3, it will be understood that separate optical modules can be provided for each of the user's two eyes. Each of the optical modules 140 can be adjusted to align with the corresponding eye of the user.

The optical module 140 can include a display element 170 that can be operated for displaying visual information for a user. The display element 170 can provide visual (e.g., image or video) output. The display element 170 can include an opaque, transparent, and/or translucent display screen. The display element 170 can emit light. Additionally or alternatively, the display element 170 can have a transparent or translucent medium through which light representative of images is directed to a user's eyes. The display element 170 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

One or more optical elements (not shown) can provide a user with a view to the display element 170. Such an optical element can include one or more lenses, diffusers, filters, polarizers, prisms, beam splitters, diffraction gratings, mirrors, and/or windows. The optical element can be configured to help optically adjust and correctly project the image-based content being displayed by the display element 170 for close-up viewing.

The display element 170 and/or the optical element can be positioned along an optical pathway 142 along which a user may be provided with a view of the visual information output by the display element 170. For example, the optical pathway 142 can be defined as a pathway along which light travels from the display element 170, optionally through the optical element, and to the user's eye. While the optical pathway 142 is shown in FIG. 3 as a line or axis, it will be understood that the optical pathway 142 can include all pathways and regions along which light can travel from the display element 170 to the user's eye. Such an optical pathway 142 can include pathways through an optical element and/or any combination of optical elements.

The optical module 140 can include a housing 150 that encloses an internal chamber 152, as well as individual components of the optical module 140.

The optical module 140 can include an extendable member 160 that supports the display element 170 and moves with respect to the housing 150. The housing 150 and the extendable member 160 can be sealed together to at least partially enclosed the chamber 152. For example, the chamber 152 can be an enclosed and/or sealed space that is isolated from an external environment. The housing 150 and the extendable member 160 can form at least a portion of a boundary of the chamber 152. It will be understood that additional components can form the boundary of the chamber 152.

The extendable member 160 can be configured to move the display element 170 relative to the housing 150 based on changes within the chamber 152. For example, the extendable member 160 can be an expandable or otherwise moveable component that transitions between at least two configurations corresponding to different positions of the display element 170. As shown in FIG. 3, the extendable member 160 can have a first (e.g., retracted) configuration in which the display element 170 is closer to the housing 150 and/or farther from the user's eye. As shown in FIG. 4, the extendable member 160 can have a second (e.g., extended) configuration in which the display element on a 70 is farther from the housing 150 and/or closer to the user's eye.

The extendable member 160 can include materials, shapes, and/or other features that facilitate transition between different configurations. For example, the extendable member 160 include a material that expands, stretches, or is otherwise malleable to facilitate movement of the display element 170. By further example, the extendable member 160 can include structures (e.g., corrugation, bellows, etc.) that alter their shape to facilitate movement of the display element 170. The extendable member 160 can include thin, stacked sheets that are coupled (e.g., laser welded) to each other at their edges. Materials for such sheets can include metals (e.g., stainless steel), plastics, and/or rubbers, as well as other materials and combinations thereof. By further example, the extendable member 160 can include structures that evert (e.g., between concave, convex, and/or flat shapes) when transitioning between configurations. By further example, the extendable member 160 can include a piston that moves within a tube. It will be understood that the extendable member 160 can maintain a sealing engagement with the housing 150 and/or other structures to keep the chamber 152 enclosed throughout movement and/or transitions. The movements of the extendable member 160 and/or the display element 170 can be facilitated by rails, grooves, pathways, and/or other structures that receive, engage, and/or interact with each other to guide, limit, and/or direct movement.

The extendable member 160 can be coupled to the display element 170 in a manner that facilitates movement of the display element 170 while protecting its structural integrity. For example, the display element 170 can be coupled to the extendable member 160 by a rigid support member. The rigid support member can transfer forces to the display element 170 without causing stresses to occur at discrete location at the display element 170. Such support protects the operating components of the display element 170 from pressure and/or temperature conditions to which it may be subjected.

As will be discussed further herein, various mechanisms can be provided to alter the temperature, pressure, and/or volume of the chamber 152 to control the position of the display element 170. Such mechanisms can be controlled based on target outcomes as well as one or more of a variety of measurements. For example, the display element 170 can be moved to a target location based on a desired visual effect that corresponds to user's perception of the display element 170 when it is positioned at the target location. The target location can be determined based on a focal length of the user and/or optical elements of the system. For example, the user's eye and/or optical elements of the system can determine how the visual output of the display element 170 will be perceived by the user. The distance between the display element 170 and the user's eye and/or the distance between the display element 170 and one or more optical elements can be altered to place the display element 170 at, within, or outside of a corresponding focal distance. Such adjustments can be useful to accommodate a particular user's eye, corrective lenses, and/or a desired optical effect. It will be understood that such movement can be controlled by mechanisms described herein for additional purposes.

The position of the display element 170 can be measured directly to provide a feedback for control actions taken with respect to the optical module 140. For example, a sensor can be provided to directly measure the proximity and/or position of the display element 170 (e.g., with an encoder) with respect to one or more other structures (e.g., the housing 150). Additionally or alternatively, the position of the display element 170 can be inferred and/or calculated based on other measurements. As shown in FIGS. 3 and 4, an internal sensor 154 can be provided within the chamber 152 and an external sensor 156 can be provided outside the chamber 152 (e.g., in an external or ambient environment). The internal sensor 154 and/or the external sensor 156 can measure one or more conditions in the corresponding environment. For example, the internal sensor 154 can measure temperature and/or pressure within the chamber 152, and the external sensor 156 can measure temperature and/or pressure outside the chamber 152 (e.g., in an external or ambient environment). The conditions measured can be used to infer the position of the display element 170. For example, the pressure and/or relative pressure can be detected based on the internal sensor 154 and/or the external sensor 156, and the position of the display element 170 can be determined based on a position that corresponds to the detected pressure and/or relative pressure. Additionally or alternatively, the temperature and/or relative temperature can be detected based on the internal sensor 154 and/or the external sensor 156, and the position of the display element 170 can be determined based on a position that corresponds to the detected temperature and/or relative temperature. The relationship of temperature, pressure, and/or position can be established during a calibration operation and recorded for use during operation of the head-mountable device. It will be understood that the internal sensor 154 and/or the external sensor 156 can be provided in any of the arrangements described herein, whether or not they are depicted in the figures.

By controlling the internal pressure, the display element 170 can be moved between a retracted configuration and an extended configuration as the extendable member 160 moves to balance the pressure within the chamber 152 with the pressure outside of the chamber 152 (e.g., ambient pressure). Additionally or alternatively, the temperature can be controlled to alter the pressure and move the display element 170.

Figure 5:
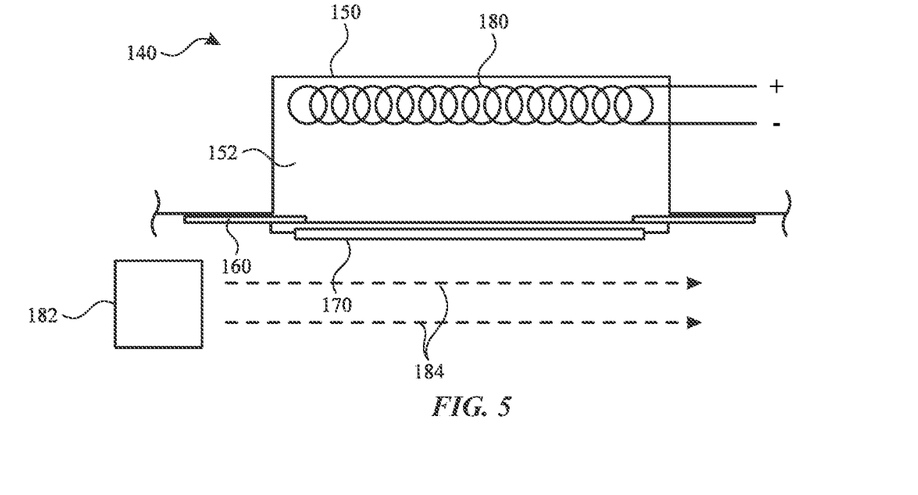
FIG. 5 illustrates a top schematic view of an optical module of the head-mountable device of FIG. 2 taken along line A-A and having an extendable member in a retracted configuration, according to some embodiments of the present disclosure.

Referring now to FIGS. 5 and 6, one or more mechanisms for managing the temperature within the chamber can be provided to control movement of a display element. For example, as shown in FIG. 5, a heating element 180 can be positioned at least partially within the chamber 152 to controllably increase a temperature within the chamber 152. For example, the heating element 180 can be or include a resistive heating element that generates heat as an electrical current is conducted there through. It will be understood that other mechanisms for generating heat can be used as an alternative to or in addition to the heating element 180.

Figure 6:
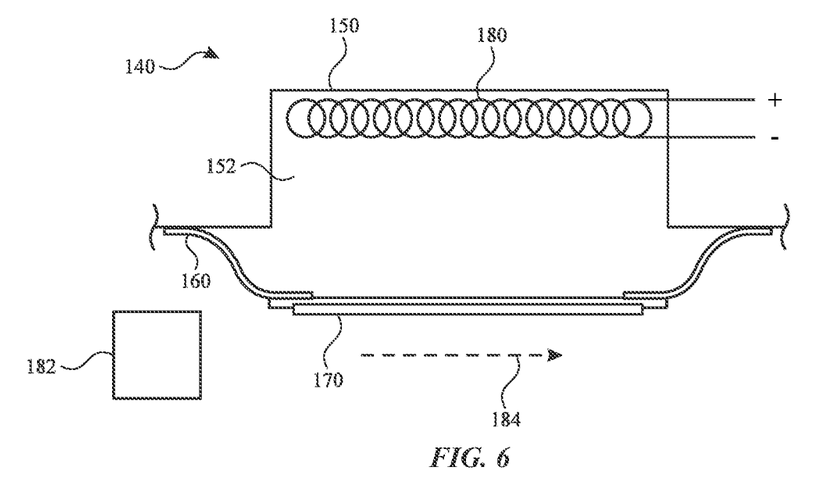
FIG. 6 illustrates another schematic view of the optical module of FIG. 5 with the extendable member in an expanded configuration, according to some embodiments of the present disclosure.

As shown in FIG. 6, as a temperature within the chamber 152 increases, the pressure within the chamber 152 also increases. In response, the extendable member 160 can move away from the housing 150 to accommodate the increased pressure by increasing the volume of the chamber 152. Such movement can continue until the pressure within the chamber 152 is balanced with a pressure outside the chamber 152. The heating element 180 can be operated accordingly to effect, maintain, arrest, and/or reverse such movement.

Referring again to FIGS. 5 and 6, the display element can also provide heat in a manner that controls its position. For example, during operation of the display element 170, it may generate heat as a byproduct. A heat sink can optionally be provided as thermally connected to the display element 170 to draw heat towards the chamber 152. The amount of heat generated can be controlled by altering operating parameters of the display element 170 (e.g., refresh rate, brightness, etc.). The heat generated by the display element 170 can similarly increase the temperature within the chamber 152 with the effects described above with respect to the heating element 180. As such, the display element 170 can be operated in lieu of and/or in concert with another source of heat to control the position of the display element 170.

Referring again to FIGS. 5 and 6, one or more cooling mechanisms can be provided to reduce temperature as desired. For example, a blower 182 can direct air or another fluid within, against, or across one or more components of the optical module 140. By way of example, the blower 182 can include blades that can move to urge air in a desired direction. As used herein, a fan can include any mechanism that provides mechanical movement of a fluid (e.g., gas or liquid). Examples include pumps, turbines, compressors, fans, and piezo air movers. The blower 182 can be operated based on one or more operating parameters that are controllable during use. The operating parameters can be determined, at least in part, based on a demand for cooling to control movement of the display element 170 to a target position.

As shown in FIG. 5, the blower 182 can be operated at a higher level (e.g., to generate greater flow 184) to more effectively dissipate heat. This can reduce the temperature within the chamber 152, reduce the pressure within the chamber 152, and allow the extendable member 160 and the display element 170 to retract. As shown in FIG. 6, the blower 182 can be operated at a lower level (e.g., to generate lesser flow 184 or no flow) to more allow heat to collect. This can increase the temperature within the chamber 152, increase the pressure within the chamber 152, and allow the extendable member 160 and the display element 170 to extend. The flow 184 provided by the blower 182 can be across any component of the optical module 140 to manage the temperature and/or pressure within the chamber 152. The flow 184 can be managed in terms of velocity, flow rate, and/or conditions (e.g., temperature, composition, etc.) of the fluid being moved.

The temperature within the chamber 152 can be managed by operating multiple components to achieve the desired result. For example, heating element 180, a display element 170, and/or a blower 182 can be operated to move the display element 170 to a target location. Where one or more of the above are constrained, the others can be operated to achieve the desired result. For example, where the display element 170 is desired to operate within particular parameters for purposes other than moving the display element 170, the heating element 180 and/or the blower 182 can be operated to counteract the effects of the display element 170. As such, the blower 182 can be controlled to operate based on the target position of the display element and an operating parameter of the display element, where the operating parameter of the display element is known to correspond to a particular amount of generated heat. By further example, where the blower 182 is incapable of providing additional cooling, the display element 170 can limit its activity to be within a particular range. As such, the display element 170 can be controlled to operate based on the target position of the display element and an operating parameter (e.g., operating limit) of the blower.

Figure 7:
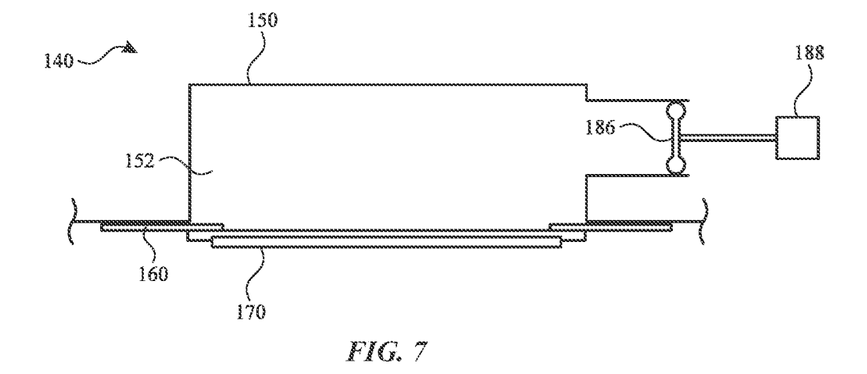
FIG. 7 illustrates a top schematic view of an optical module of the head-mountable device of FIG. 2 taken along line A-A and having an extendable member in a retracted configuration, according to some embodiments of the present disclosure.

Referring now to FIGS. 7 and 8, one or more mechanisms for managing the volume within the chamber can be provided to control movement of a display element. For example, as shown in FIG. 7, a piston 186 can be positioned at least partially within the chamber 152 to controllably move within a portion thereof. By further example, the piston 186 can move within a tube (e.g., formed by part of the housing 150). It will be understood that the piston 186 can maintain a sealing engagement with the housing 150 and/or other structures to keep the chamber 152 enclosed throughout its movements and/or transitions. Additionally or alternatively, the piston 186 can provide a bellows structure that flexes in response to a mechanical stimulus. The movements of the piston 186 can be controlled by an actuator 188. The actuator 188 can include or be connected to motors, hydraulic actuators, pneumatic actuators, magnetic actuators, piezoelectric actuators, electroactive materials (e.g., polymers), stepper motors, shape-memory alloys, and the like, as well as drivetrain components such as gears, clutches, and/or transmissions, to facilitate independent or simultaneous movement of components based on operation of corresponding actuators. Other types of actuators 188 are contemplated. For example, an actuator can include a heat sensitive material (e.g., forming a diaphragm) that actuates in response to an applied temperature change. The movements of the piston 186 can be facilitated by rails, grooves, pathways, and/or other structures that receive, engage, and/or interact with each other to guide, limit, and/or direct movement.

Figure 8:
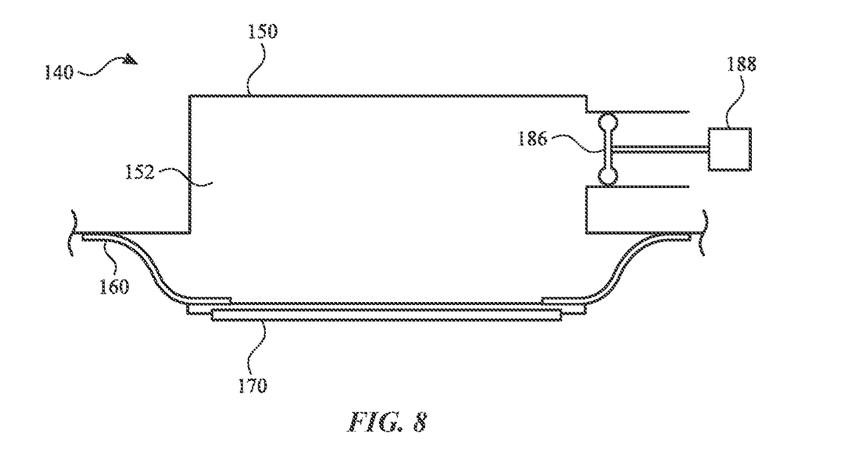
FIG. 8 illustrates another schematic view of the optical module of FIG. 7 with the extendable member in an expanded configuration, according to some embodiments of the present disclosure.

As shown in FIG. 8, as a piston 186 moves, the extendable member 160 also moves to maintain the total volume within the chamber 152. The extendable member 160 and/or the display element 170 can move away from the housing 150 to accommodate the movement of the piston 186. Such movement can continue until the pressure within the chamber 152 is balanced with a pressure outside the chamber 152. The actuator 188 can be operated accordingly to effect, maintain, arrest, and/or reverse such movement.

While only a single piston 186 is shown in FIGS. 7 and 8, it will be understood that multiple pistons can. Separate pistons can have different diameters based on different amounts of movement desired and the response time in which the movement is to be achieved. For example, smaller pistons can provide a faster response time as well as smaller fine tuning adjustments to the position of the display element 170.

It will be understood that other mechanisms for managing the volume of the chamber 152 can be applied. For example, an air tank can be provided in connection with the chamber 152 inject or release air or another fluid into or out of the chamber 152. Additionally or alternatively, the error other fluid within the chamber 152 can be compressed or otherwise stored to reduce the volume of the chamber 152.

Figure 9:
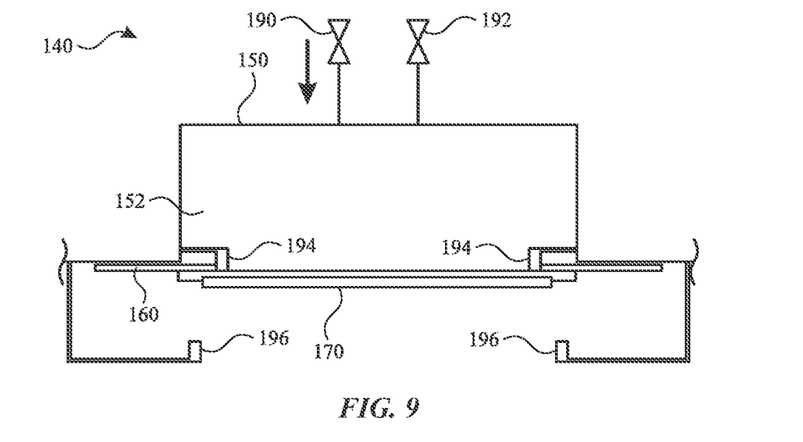
FIG. 9 illustrates a top schematic view of an optical module of the head-mountable device of FIG. 2 taken along line A-A and having an extendable member in a retracted configuration, according to some embodiments of the present disclosure.
Figure 10:
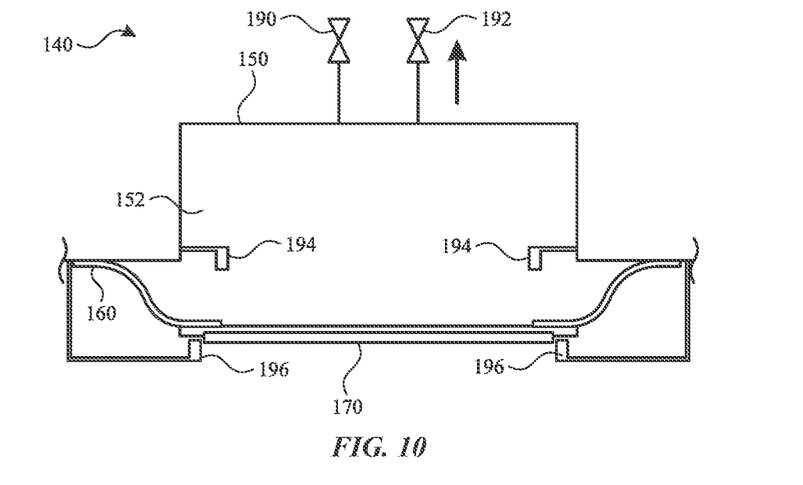
FIG. 10 illustrates another schematic view of the optical module of FIG. 9 with the extendable member in an expanded configuration, according to some embodiments of the present disclosure.

Referring now to FIGS. 9 and 10, the chamber can be protected and the movement of the display element limited by mechanisms that control conditions within the chamber. Where the chamber is fully closed, rapid cooling and/or heating can cause the chamber to deform. Additionally, the display element, if moved too far, can collide with neighboring structures. Accordingly, structures can be provided to limit movement in a manner that does not damage the display element or other components.

As shown in FIGS. 9 and 10, stoppers can be provided to limit movement of the display element. One or more inner stoppers 194 can be provided to limit movement of the display element 170 toward the housing 150. Additionally or alternatively, one or more outer stoppers 196 can be provided to limit movement of the display element 170 away from the housing 150. The inner stoppers 194 and/or the outer stoppers 196 can be positioned to engage the extendable member 160, the display element 170, and/or another structure upon movement thereof to a given position.

The inner stoppers 194 and/or the outer stoppers 196 can define a range of acceptable movement for the display element 170. As shown in FIG. 9, the inner stoppers 194 can define a most retracted position that would be desired. As shown in FIG. 10, the outer stoppers 196 can define a most extended position that would be desired. With the stoppers in place, the burden of precisely controlling the position of the display element 170 with the other mechanisms described herein is reduced because the stoppers can hold the display element 170 at a given position.

As further shown in FIGS. 9 and 10, valves can be provided to limit movement of the display element and/or ensure that pressure within the chamber remains within safe limits. One or more inlet valves 190 can be provided to limit movement of the display element 170 toward the housing 150 by injecting air or another fluid into the chamber 152 to maintain a minimum volume of the chamber 152. Additionally or alternatively, one or more outlet valves 192 can be provided to limit movement of the display element 170 away from the housing 150 by releasing air or another fluid from the chamber 152 to maintain a maximum volume of the chamber 152. The valves can be actively or passively controlled. For example, the valves can include solenoid valves that are controlled to allow air or another fluid to flow there through. The valves can be one-way valves or two-way valves. Additionally or alternatively, the valves can be spring loaded to open a certain pressure limits to passively control pressure.

As shown in FIG. 9, the inlet valve 190 can be operated when the display element 170 reaches a desired target location, but would otherwise retract further, and/or when the pressure within the chamber reaches a minimum desired value. Accordingly, the inlet valve 190 can be operated to allow air or another fluid to enter the chamber 152 so that the display element 170 is not retracted beyond a target location. As shown in FIG. 10, the outlet valve 192 can be operated when the display element 170 reaches a desired target location, but would otherwise extend further, and/or when the pressure within the chamber reaches a maximum desired value. Accordingly, the outlet valve 192 can be operated to allow air or another fluid to exit the chamber 152 so that the display element 170 is not extended beyond a target location. By operating the valves as described herein, the burden of precisely controlling the position of the display element 170 with the other mechanisms described herein is reduced because the valves can independently modify conditions within the chamber 152 to maintain the display element 170 at a given position.

While the stoppers and valves are shown in combination in FIGS. 9 and 10, it will be understood that they can be provided separately or in any combination. For example, an optical module can include one or more of any of an inlet valve 190, an outlet valve 192, an inner stopper 194, and/or an outer stopper 196.

It will be further understood that the stoppers and/or valves described herein can be used with any of the optical modules 140 described herein. For example, an optical module can include one or more of an inlet valve 190, an outlet valve 192, an inner stopper 194, and/or an outer stopper 196 in combination with a heating element 180, a blower 182, and/or a piston 186.

While adjustments can be performed with respect to a display element as described herein, it will be understood that, additionally or alternatively, adjustments can be performed with respect to one or more other components of the optical module 140. For example, the optical element and/or a combination of optical elements can be controllably moved during use of the head-mountable device 100.

Figure 11:
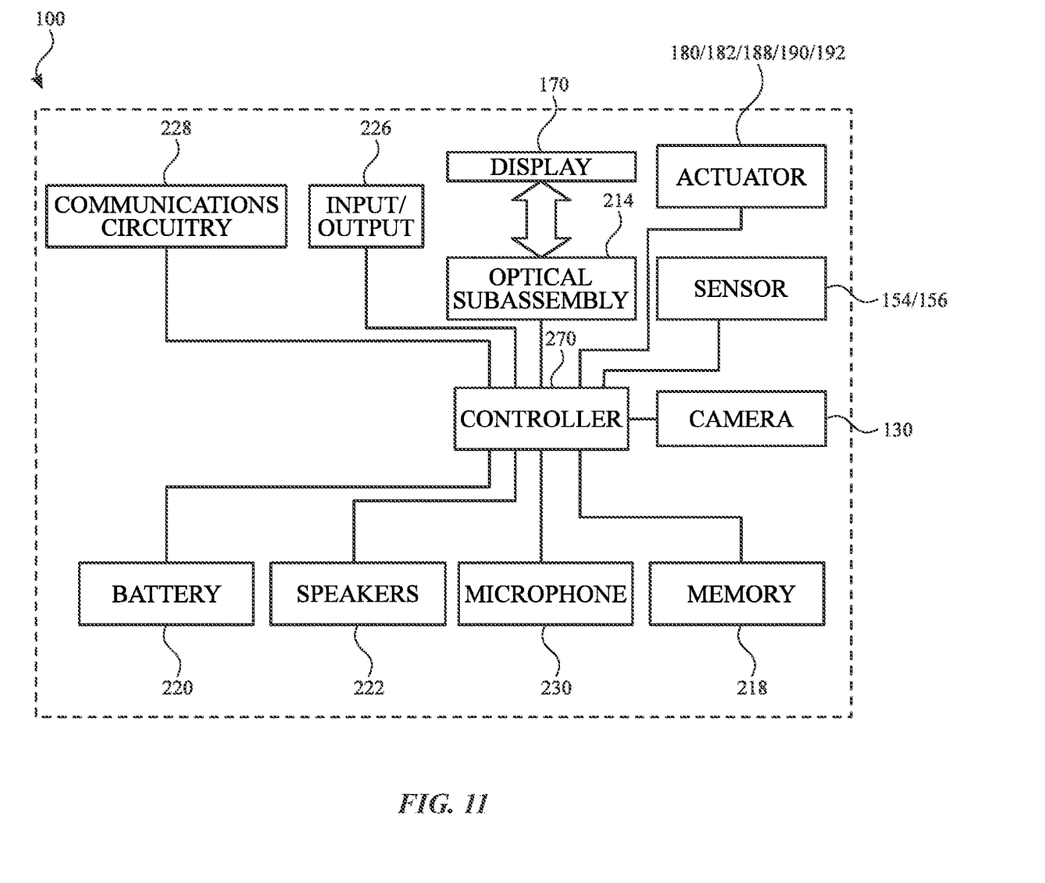
FIG. 11 illustrates a block diagram of a head-mountable device, in accordance with some embodiments of the present disclosure.

Referring now to FIG. 11, components of the head-mountable device can be operably connected to provide the performance described herein. FIG. 11 shows a simplified block diagram of an illustrative head-mountable device 100 in accordance with one embodiment of the invention. It will be appreciated that components described herein can be provided on either or both of a frame and/or a securement element of the head-mountable device 100.

As shown in FIG. 11, the head-mountable device 100 can include a controller 270 with one or more processing units that include or are configured to access a memory 218 having instructions stored thereon. The instructions or computer programs may be configured to perform one or more of the operations or functions described with respect to the head-mountable device 100. The controller 270 can be implemented as any electronic device capable of processing, receiving, or transmitting data or instructions. For example, the controller 270 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mountable device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mountable device 100 can further include an optical module for displaying visual information for a user, including the display element 170 and/or an optical subassembly 214 (e.g., the optical element), as discussed herein. The head-mountable device 100 can further include the actuators, as discussed herein, such as one or more of the heating element 180, the blower 182, the actuator 188, the inlet valve 190, and/or the outlet valve 192. The head-mountable device 100 can further include the internal sensor 154 and/or the external sensor 156, as discussed herein.

The head-mountable device 100 can include the camera 130 for capturing a view of an environment external to the head-mountable device 100. The camera 130 can include an optical sensor, such as a photodiode or a photodiode array. Additionally or alternatively, the camera 130 can include one or more of various types of optical sensors that are arranged in various configurations for detecting user inputs described herein. The camera 130 may be configured to capture an image of a scene or subject located within a field of view of the camera 130. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The head-mountable device 100 can include a battery 220, which can charge and/or power components of the head-mountable device 100.

The head-mountable device 100 can include an input/output component 226, which can include any suitable component for connecting head-mountable device 100 to other devices. Suitable components can include, for example, audio/video jacks, data connectors, and/or any additional or alternative input/output components.

The head-mountable device 100 can include communications circuitry 228 for communicating with one or more servers or other devices using any suitable communications protocol. For example, the communications circuitry 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communications circuitry 228 can also include an antenna for transmitting and receiving electromagnetic signals.

The head-mountable device 100 can include a microphone 230. The microphone 230 can be operably connected to the controller 270 for receiving audio input, including voice commands from the user.

The head-mountable device 100 can include speakers 222. The speakers 222 can be operably connected to the controller 270 for control of speaker output, including sound levels.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

Accordingly, embodiments of the present disclosure provide a head-mountable device with an optical module that provides a display element that is moveable based on pressure and/or temperature changes within an enclosed chamber. The control mechanisms can directly and/or indirectly alter one or more of the temperature, pressures, and/or volume of the enclosed chamber. As the conditions within the chamber are altered, an extendable member can expand and/or retract to move the display element towards and/or away from a user's eye. The mechanisms for controlling the position of the display element can be actively and/or passively controlled.

Various examples of aspects of the disclosure are described below as clauses for convenience. These are provided as examples, and do not limit the subject technology.

Clause A: a head-mountable device comprising: an optical module comprising: a housing; an extendable member that is movable with respect to the housing, wherein the housing and the extendable member are sealed together to at least partially enclose a chamber; a display element coupled to the extendable member; and a heating element within the chamber; and a controller configured to operate the heating element to alter a temperature within the chamber until the extendable member moves the display element to a target position relative to the housing.

Clause B: a head-mountable device comprising: an optical module comprising: a housing; an extendable member that is movable with respect to the housing, wherein the housing and the extendable member are sealed together to at least partially enclose a chamber; a display element coupled to the extendable member; and a blower; and a controller configured to operate the blower to alter a temperature within the chamber until the extendable member moves the display element to a target position relative to the housing.

Clause C: a head-mountable device comprising: an optical module comprising: a housing; an extendable member that is movable with respect to the housing; a piston that is movable with respect to the housing, wherein the housing, the extendable member, and the piston are sealed together to at least partially enclose a chamber; an actuator configured to move the piston; and a display element coupled to the extendable member; and a controller configured to operate the actuator to move the piston with respect to the housing until the extendable member moves the display element to a target position relative to the housing.

One or more of the above clauses can include one or more of the features described below. It is noted that any of the following clauses may be combined in any combination with each other, and placed into a respective independent clause, e.g., clause A, B, or C.

Clause 1: the extendable member comprises a bellows that is expandable to move the display element with respect to the housing.

Clause 2: the extendable member comprises a piston that sealingly engages the housing while moving the display element with respect to the housing.

Clause 3: a first pressure sensor configured to detect a pressure within the chamber; and a second pressure sensor configured to detect a pressure outside the chamber, wherein the controller is configured to operate the heating element based on the pressure within the chamber and the pressure outside the chamber.

Clause 4: a first temperature sensor configured to detect a temperature within the chamber; and a second temperature sensor configured to detect a temperature outside the chamber, wherein the controller is configured to operate the heating element based on the temperature within the chamber and the temperature outside the chamber.

Clause 5: a first stopper configured to abut the display element when the display element moves to a first position with respect to the housing; and a second stopper configured to abut the display element when the display element moves to a second position with respect to the housing.

Clause 6: a first valve configured to release a fluid from the chamber when the display element moves to a first position with respect to the housing; and a second valve configured to inject a fluid into the chamber when the display element moves to a second position with respect to the housing.

Clause 7: the controller is further configured to operate the blower based on the target position of the display element and an operating parameter of the display element.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   an optical module comprising:
      a housing;
      an extendable member that is movable with respect to the housing, wherein the housing and the extendable member are sealed together to at least partially enclose a chamber;
      a display element coupled to the extendable member; and
      a heating element within the chamber; and
   a controller configured to operate the heating element to alter a temperature within the chamber until the extendable member moves the display element to a target position relative to the housing.

2. The head-mountable device of claim 1, wherein the extendable member comprises a bellows that is expandable to move the display element with respect to the housing.

3. The head-mountable device of claim 1, wherein the extendable member comprises a piston that sealingly engages the housing while moving the display element with respect to the housing.

4. The head-mountable device of claim 1, further comprising:
   a first pressure sensor configured to detect a pressure within the chamber; and
   a second pressure sensor configured to detect a pressure outside the chamber, wherein the controller is configured to operate the heating element based on the pressure within the chamber and the pressure outside the chamber.

5. The head-mountable device of claim 1, further comprising:
   a first temperature sensor configured to detect a temperature within the chamber; and
   a second temperature sensor configured to detect a temperature outside the chamber, wherein the controller is configured to operate the heating element based on the temperature within the chamber and the temperature outside the chamber.

6. The head-mountable device of claim 1, further comprising:
   a first stopper configured to abut the display element when the display element moves to a first position with respect to the housing; and
   a second stopper configured to abut the display element when the display element moves to a second position with respect to the housing.

7. The head-mountable device of claim 1, further comprising:
   a first valve configured to release a fluid from the chamber when the display element moves to a first position with respect to the housing; and
   a second valve configured to inject a fluid into the chamber when the display element moves to a second position with respect to the housing.

8. A head-mountable device comprising:
   an optical module comprising:
      a housing;
      an extendable member that is movable with respect to the housing, wherein the housing and the extendable member are sealed together to at least partially enclose a chamber;
      a display element coupled to the extendable member; and
      a blower; and
   a controller configured to operate the blower to alter a temperature within the chamber until the extendable member moves the display element to a target position relative to the housing.

9. The head-mountable device of claim 8, wherein the controller is further configured to operate the blower based on the target position of the display element and an operating parameter of the display element.

10. The head-mountable device of claim 8, wherein the extendable member comprises a bellows that is expandable to move the display element with respect to the housing.

11. The head-mountable device of claim 8, wherein the extendable member comprises a piston that sealingly engages the housing while moving the display element with respect to the housing.

12. The head-mountable device of claim 8, further comprising:
   a first pressure sensor configured to detect a pressure within the chamber; and
   a second pressure sensor configured to detect a pressure outside the chamber, wherein the controller is configured to operate the blower based on the pressure within the chamber and the pressure outside the chamber.

13. The head-mountable device of claim 8, further comprising:
   a first temperature sensor configured to detect a temperature within the chamber; and
   a second temperature sensor configured to detect a temperature outside the chamber, wherein the controller is configured to operate the blower based on the temperature within the chamber and the temperature outside the chamber.

14. The head-mountable device of claim 8, further comprising:
   a first stopper configured to abut the display element when the display element moves to a first position with respect to the housing; and
   a second stopper configured to abut the display element when the display element moves to a second position with respect to the housing.

15. The head-mountable device of claim 8, further comprising:
   a first valve configured to release a fluid from the chamber when the display element moves to a first position with respect to the housing; and
   a second valve configured to inject a fluid into the chamber when the display element moves to a second position with respect to the housing.

16. A head-mountable device comprising:
   an optical module comprising:
      a housing;
      an extendable member that is movable with respect to the housing;
      a piston that is movable with respect to the housing, wherein the housing, the extendable member, and the piston are sealed together to at least partially enclose a chamber;
      an actuator configured to move the piston; and
      a display element coupled to the extendable member; and
   a controller configured to operate the actuator to move the piston with respect to the housing until the extendable member moves the display element to a target position relative to the housing.

17. The head-mountable device of claim 16, wherein the extendable member comprises a bellows that is expandable to move the display element with respect to the housing.

18. The head-mountable device of claim 16, wherein the extendable member comprises an additional piston that sealingly engages the housing while moving the display element with respect to the housing.

19. The head-mountable device of claim 16, further comprising:
- a first stopper configured to abut the display element when the display element moves to a first position with respect to the housing; and
- a second stopper configured to abut the display element when the display element moves to a second position with respect to the housing.

20. The head-mountable device of claim 16, further comprising:
- a first valve configured to release a fluid from the chamber when the display element moves to a first position with respect to the housing; and
- a second valve configured to inject a fluid into the chamber when the display element moves to a second position with respect to the housing.

* * * * *